United States Patent [19]

Colcord et al.

[11] Patent Number: 5,043,083

[45] Date of Patent: Aug. 27, 1991

[54] METHOD FOR PREPARING SALTS OF POLYOLEFINIC SUBSTITUTED DICARBOXYLIC ACIDS IN OLEAGINOUS MIXTURES OF REDUCED VISCOSITY

[75] Inventors: Laura J. Colcord, Maplewood, N.J.; Jacob Emert, Brooklyn, N.Y.; Malcolm Waddoups, Westfield; Robert D. Lundberg, Bridgewater, both of N.J.

[73] Assignee: Exxon Chemical Patents, Inc., Linden, N.J.

[21] Appl. No.: 306,117

[22] Filed: Feb. 6, 1989

Related U.S. Application Data

[63] Continuation-in-part of Ser. No. 207,611, Jun. 16, 1988, abandoned.

[51] Int. Cl.$^5$ .......................................... C10M 129/26
[52] U.S. Cl. .......................................... 252/35; 252/34
[58] Field of Search ................................ 252/35, 34

[56] References Cited

U.S. PATENT DOCUMENTS

| Re. 26,433 | 8/1968 | Le Suer | 252/35 |
|---|---|---|---|
| 2,458,425 | 1/1949 | Rocchini | 252/33.6 |
| 2,699,427 | 1/1955 | Smith et al. | 252/33.6 |
| 3,121,057 | 2/1964 | Gee et al. | 252/33.6 |
| 3,163,603 | 12/1964 | LeSuer | 252/33.6 |
| 3,247,110 | 4/1966 | Gee et al. | 252/35 |
| 3,271,310 | 9/1966 | Le Suer | 252/35 |
| 3,306,908 | 2/1967 | LeSuer | 260/326.3 |
| 3,346,493 | 10/1967 | LeSuer | 252/32.5 |
| 3,574,101 | 4/1971 | Murphy | 252/33 |
| 3,649,661 | 3/1972 | Otto et al. | 260/429.7 |
| 3,652,616 | 3/1972 | Watson | 260/429 R |
| 3,755,167 | 8/1973 | Otto et al. | 252/33.2 |
| 3,791,805 | 2/1974 | Brannen et al. | 44/68 |
| 3,808,131 | 4/1974 | Otto et al. | 252/32.5 |
| 3,945,933 | 3/1976 | Chibnik et al. | 252/33.3 |
| 4,093,614 | 6/1978 | Chibnik et al. | 260/299 |
| 4,096,077 | 6/1978 | Swakon | 252/35 |
| 4,234,435 | 11/1980 | Meinhardt et al. | 252/51.5 A |
| 4,486,326 | 12/1984 | Gutierrez et al. | 252/49.7 |
| 4,552,677 | 11/1985 | Hopkins | 252/33.6 |
| 4,751,011 | 6/1988 | Lundberg et al. | 252/35 |
| 4,770,799 | 9/1988 | Farng et al. | 252/35 |
| 4,870,197 | 9/1989 | Gutierrez et al. | 556/117 |

*Primary Examiner*—Prince E. Willis
*Assistant Examiner*—Jerry D. Johnson
*Attorney, Agent, or Firm*—J. B. Murray, Jr.

[57] ABSTRACT

The present invention is directed to methods of producing reduced viscosity oleaginous compositions containing Group I-B, II-A and II-B metal, particularly copper and/or zinc, salts of the product of a polyolefin having a number average molecular weight ($M_n$) of at least 600 which has been substituted with at least one dicarboxylic acid producing moiety per polyolefin molecule, wherein the metal salt product is contacted with lower aliphatic, cycloaliphatic or aromatic amines having from 1 to 4 nitrogen atoms per molecule. The compositions of the present invention can also provide increased stability to viscosity growth, e.g. during storage of the materials prepared by the process of this invention. The resulting solutions are useful in lubricating oils as additives, e.g., as antioxidant lube oil additives.

36 Claims, No Drawings

METHOD FOR PREPARING SALTS OF POLYOLEFINIC SUBSTITUTED DICARBOXYLIC ACIDS IN OLEAGINOUS MIXTURES OF REDUCED VISCOSITY

CROSS-REFERENCE TO RELATED APPLICATIONS

This application is a continuation-in-part of our co-pending application Ser. No. 207,611, filed June 16, 1988, now abandoned and is related to co-pending applications Ser. No. 940,870, filed Dec. 12, 1986, now U.S. Pat. No. 4,870,197; Ser. No. 940,984, filed Dec. 12, 1986, now abandoned; Ser. No. 941,094, filed Dec. 12, 1986, now abandoned and Ser. No. 941,095, filed Dec. 12, 1986, now U.S. Pat. No. 4,751,011.

FIELD OF THE INVENTION

This invention is directed generally to a process for preparing metal salts of polyolefinic substituted dicarboxylic acids and more particularly to a process for preparing oleaginous mixtures of such metal salts having reduced viscosity and decreased viscosity growth. The method involves the step of providing at least one Group I-B, II-A or II-B metal salt of a polyolefinic substituted dicarboxylic acid, and thereafter contacting the product of the first step with a specific class of amines.

BACKGROUND OF THE INVENTION

There are several methods for preparing the Group I-B and II-B metal salts of polyolefinic substituted dicarboxylic acids.

U.S. Pat. No. 4,552,677 to Hopkins is an indication of prior art processes, wherein a copper compound such as cupric acetate hydrate, basic cupric acetate, cuprous carbonate, basic cupric carbonate, and cuprous or cupric hydroxide is introduced into a reaction vessel containing a hydrocarbyl substituted succinic anhydride derivative. A variety of acidic, neutral and basic copper salts are shown as products.

Similarly, U.S. Pat. No. 3,271,310, to LeSuer, shows the production of a similar selection of salts, including Group I-B metal salts, using analogous technology.

U.S. Pat. No. 3,574,101 discloses the preparation of oil-soluble carboxylic acid acylating agents by reacting a high molecular weight mono- or polycarboxylic acid with a sulfonating agent. The resulting acylating agents are disclosed to be useful as intermediates in the preparation of metal salts, and the metal salts and the acylating agents are disclosed to be useful additives for lubricants and fuels and as intermediates for preparation of other lubricant and fuel additives, particularly high molecular weight oil-soluble acylated nitrogen compositions and esters. Such nitrogen compositions are exemplified by reaction of a tetraethylene pentamine with the sodium salt of a polyisobutylene succinic anhydride-chlorosulfonic acid product.

U.S. Pat. No. 3,652,616 relates to additives for fuels and lubricants prepared by reacting a hydrocarbon-substituted succinic anhydride and an alkylene polyamine to form a material which is then reacted with one of a recited class of metallic materials including metal salts of carboxylic acids, metal thiocyanates, metal acid complexes (e.g., acids having cyanate, chloride, or thiocyanate moieties) and metal oxides or sulfides.

U.S. Pat. No. 4,770,799 relates to copper salts of certain hindered phenol substituted succinic anhydride derivatives as antioxidant additives.

SUMMARY OF THE INVENTION

The present invention is directed to methods of producing reduced viscosity oleaginous compositions containing Group I-B, II-A and II-B metal, particularly copper and/or zinc, salts of the product of a polyolefin having a numerical average molecular weight ($\overline{M}_n$) of at least 600 which has been substituted with at least one dicarboxylic acid producing moiety per polyolefin molecule. The compositions of the present invention can also provide increased stability to viscosity growth, e.g. during storage of the materials prepared by the process of this invention.

The process uses inexpensive amine and metal-bearing reactants, and can be employed to treat the polyolefinic substituted dicarboxylic acid metal salt which can be obtained by a variety of methods.

The resulting oleaginous compositions have been found to have a significantly reduced viscosity, and also to undergo substantially less viscosity growth during storage. The product of this invention therefore provides compositions containing metal salts of such polyolefinic substituted dicarboxylic acids which are much easier to handle and use than those obtained in the absence of such amine-treatment step, as in U.S. Pat. No. 4,870,197.

DESCRIPTION OF THE PREFERRED EMBODIMENT

The invention is to methods of producing metal salts of the product of a polyolefin having a $\overline{M}_n$ of at least 600 which has been substituted with at least one dicarboxylic acid producing moiety per polyolefin molecule.

The metal salts have a variety of utilities as, for instance, compatibilizing agents or dispersants in lubricating oil formulations.

Metal Salts of Polyolefinic Substituted Dicarboxylic Acids

The metal salts of polyolefinic substituted dicarboxylic acids preferred for treatment in this invention are derived by reacting a metal-containing organic or inorganic compound containing the selected metal with long chain olefinic substituted dicarboxylic acid materials, i.e., acid anhydride, or ester, and include long chain hydrocarbons, generally olefin polymers which are substituted with alpha or beta unsaturated $C_4$ to $C_{10}$ dicarboxylic acids (e.g., itaconic acid, maleic acid, maleic anhydride, chloromaleic acid, dimethyl fumarate, chloromaleic anhydride and mixtures thereof).

Preferred olefin polymers from which the polyolefinic substituted dicarboxylic acid moieties of the metal salts are derived are those polymers made up of a major molar amount of $C_2$ to $C_{10}$ monoolefin, e.g., $C_2$ to $C_5$, monoolefin. Such olefins include ethylene, propylene, butylene, isobutylene, pentene, octene-1, styrene, etc. The polymers may be homopolymers such as polyisobutylene or copolymers of two or more of such olefins. These include copolymers of: ethylene and propylene; butylene and isobutylene; propylene and isobutylene; etc. Other copolymers include those in which a minor molar amount of the copolymer monomers, e.g., 1 to 10 mole percent, is a $C_4$ to $C_{18}$ diolefin, e.g., copolymers of isobutylene and butadiene; or copolymers of ethylene, propylene and 1,4-hexadiene, 5-ethylidene-2-norbonene; etc.

In some cases, the olefin polymer may be completely saturated, for example, an ethylene-propylene copolymer made by a Ziegler-Natta synthesis using hydrogen as a moderator to control molecular weight.

The olefin polymers will usually have number average molecular weights ($\overline{M}_n$) above about 600. Particularly useful olefin polymers have number average molecular weights within the range of about 900 and about 5,000 with approximately one double bond per polymer chain. An especially suitable starting material is polyisobutylene. The number average molecular weight for such polymers can be determined by several known techniques. A convenient method for such determination is by gel permeation chromatography (GPC) which additionally provides molecular weight distribution information (see W. W. Yua, J. J. Kirkland and D. D. Bly, "Modern Size Exclusion Liquid Chromatography," John Wiley and Sons, New York, 1979).

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 weight percent chlorine, or bromine, based on the weight of polymer, by passing the chlorine or bromine through the polyolefin at a temperature of 100° to 250°, e.g., 140° to 225° C. for about 0.5 to 10, e.g., 3 to 8 hours. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 weight percent of the polyolefin will normally react with the dicarboxylic acid material. Thermal reactions, those carried out without the use of halogen or a catalyst, cause only about 50 to 75 weight percent of the polyisobutylene to react. Chlorination obviously helps to increase the reactivity.

The metals useful in the metal salts of this invention comprises salts of metals of Groups I-B, II-A and II-B of the Periodic Table, e.g. copper, zinc, iron, cobalt, molybdenum, magnesium, calcium, strontium, barium and the like, with copper and zinc being preferred. The metal salt can comprise one or a mixture of the foregoing metals and can comprise an acid or neutral salt of the selected polyolefinic dicarboxylic acid material. By "acid salt" is meant a material which is a half-salt of the dicarboxylic acid, that is a material wherein one of the carboxy groups is a —COOMe group, wherein "Me" is the metal, and the other is an acid —COOH group. By "neutral salt" is meant a material in which both carboxy groups of the dicarboxylic acid material form salts of the metal.

Preferred polyolefinic substituted dicarboxylic acids are polyisobutenyl succinic acid, polybutenyl succinic acid, and the anhydrides thereof.

Especially preferred are copper and zinc salts of polyisobutenyl succinic acid and polyisobutenyl succinic anhydride wherein the polyisobutenyl group is derived from a polymer having a number average molecular weight of from about 900 to about 3000.

The metal salts of such polyolefinic substituted dicarboxylic acids can be prepared by any convenient method. For example, the selected polyolefinic substituted dicarboxylic acid or anhydride can be reacted with an inorganic compound containing the selected metal (e.g., the metal oxide, carbonate, hydroxide, and the like) for a time and under conditions sufficient to form the desired metal salt of the polyolefinic substituted dicarboxylic acid (e.g., at 100° C. for 8 hours). The reaction medium can then be stripped with an inert gas (e.g. $N_2$ gas stripping for 3 hours at 135° C.) to remove the water of reaction. Alternately, the polyolefinic substituted dicarboxylic acid or anhydride can be reacted with an organic compound of the metal (e.g., a metal alkanoate salt, such as the acetate or propionate), again followed by stripping.

A preferred method is disclosed in U.S. Pat. No. 4,870,197 (the disclosure of which is hereby incorporated by reference in its entirety) wherein the metal salts are prepared by reaction of an inorganic compound of the metal (e.g., the metal oxide, carbonate, hydroxide, and the like) with the polyolefinic substituted dicarboxylic acid or anhydride in the presence of a short chain alkanoic acid (e.g. acetic or propionic acid). The reaction is typically carried out in a liquid reaction solvent comprising a hydrocarbon oil (such as a mineral oil, synthetic lubricating oil and the like) and will be typically conducted at a temperature in the range of from about 70° to 150° C., followed by stripping with unreactive gas, such a nitrogen, to remove various light materials (such as unreacted alkanoic acid) and then filtered to remove any insolubles, such as unreacted metal-containing starting materials and by-products. Alternatively, the filtering at this stage can be deferred until completion of the amine-contacting step, which will now be described below.

In the above processes, water will be generally introduced into the reaction medium if the selected polyolefinic substituted dicarboxylic acid material comprises the anhydride, to facilitate reaction of the desired dicarboxylic acid groups.

Amine Reactants

The metal salt product obtained as above can also contain quantities of unreacted polyolefin substituted dicarboxylic acid or corresponding anhydride. Where present, the concentration of unreacted polyolefin substituted dicarboxylic acid or corresponding anhydride will generally range from about 1 to 20 wt%, more typically from about 5 to 15 wt%. It has been found that this metal salt product is a very viscous component of lubricating oils and that its viscosity increases upon storage, most likely because of aggregation of its contained ionic species. This leads to difficulties in manufacturing, handling and using the metal salt product, e.g., in lubricating oils as an antioxidant. It has been found that these problems can be minimized by contacting the metal salt product with certain amines. This contacting treatment both decreases the initial viscosity of the product and reduces the rate of viscosity growth.

In this second step of the process of this invention, the metal salt product is contacted with at least one member of a certain class of amine treatment compounds under conditions sufficient for reaction (or complexation) of the amine with at least a portion of the polyolefin substituted dicarboxylic acid metal salt product, that is, the product mixture containing the polyolefinic substituted dicarboxylic acid groups previously reacted with the selected metal, and unreacted quantities of the polyolefinic substituted dicarboxylic acid material. The amine treatment compound, therefore, should be one which is reactive with the carboxylic acid or anhydride groups of the dicarboxylic acid material, but it should also not interact with the metal salt in such a way as to form an oil-insoluble, metal-containing precipitate. Furthermore, it is preferred, although not required, that the amine compound be one which has a convenient boiling point to allow any excess amine to be easily stripped out from the amine contacting mixture.

It has been surprisingly found that alkylene polyamines having greater than about 5 nitrogen atoms, which are typically employed in the manufacture of lubricating oil nitrogen-containing dispersant additives, form undesirable side-reactions with the metal component in the additive to be treated, as will be further discussed below. For example, poly(ethyleneamine) compounds averaging from above about 5 to 7 nitrogen atoms per molecule, which are available commercially under trade names such as "Polyamine H", "Polyamine 400", and "Dow Polyamine E-100", should not be employed as amine treatment compounds in this invention since they have been found to cause formation of oil-insoluble precipitates from the metal salt products.

Useful amine treatment compounds for this invention comprise at least one member selected from the group consisting of aliphatic, cycloaliphatic and aromatic amines containing from 1 to 4 nitrogen atoms per molecule, wherein at least one of the nitrogen atoms is primary or secondary. Generally, the amine compound will contain up to about 25 carbon atoms, and preferably up to about 15 carbon atoms, per molecule.

Therefore, useful amines for this invention include linear and branched polyethylene or polypropylene amines containing up to 4 nitrogens per molecule. The nitrogen atoms may be secondary or primary, and preferably the amine reactant contains at least one primary amine. Most preferably, the amine compound contains from 1 to 2 primary amine groups.

These amines may be hydrocarbyl amines or may be hydrocarbyl amines including other groups, e.g., hydroxy groups, alkoxy groups, amide groups, nitriles, imidazoline groups, and the like. Hydroxy amines with 1 to 3 hydroxy groups, preferably 1 hydroxy group, are particularly useful. Preferred amines are aliphatic saturated amines, including those of the general formulas:

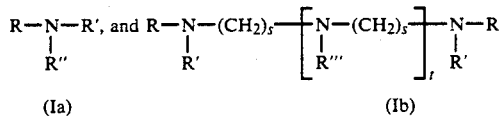

(Ia)   (Ib)

wherein R, R', R" and R'" are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R'" can additionally comprise a moiety of the formula:

(Ic)

wherein R' is as defined above, and wherein each s and s' can be the same or a different number of from 2 to 6, preferably 2 to 4; and t and t' can be the same or different and are each numbers of typically from 0 to 2, preferably 1, with the proviso that the amine contains not greater than 4 nitrogen atoms. To assure a facile reaction it is preferred that R, R', R", R'", (s), (s'), (t) and (t') be selected in a manner sufficient to provide the compounds of formulas Ia and Ib with typically at least one primary amine group, preferably two primary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine and triethylene tetramine; 1,2-propylene diamine; polypropylene amines such as di-(1,2-propylene)triamine and di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 2-propyl-dodecylamine; N-dodecyl-1,3-propylene diamine; diisopropanol amine; diethanol amine; amino morpholines such as N-(3-aminopropyl) morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (II):

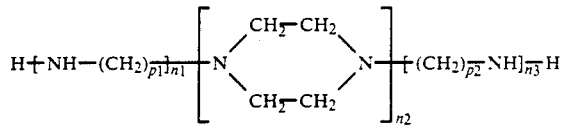

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1 n_2$ and $n_3$ is not greater than 3. Non-limiting examples of such amines include N-(2-aminoethyl) piperazine.

Commercial mixtures of amine compounds may advantageously be used, provided they contain an average of not greater than about 4 nitrogen atoms per molecule. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine and corresponding piperazines.

Useful amines also include polyoxyalkylene polyamines such as those of the formulae:

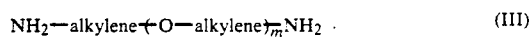

(III)

where m has a value of about 1 to 2; and

(IV)

where "n" has a value of about 1 to 2, and R is a substituted saturated hydrocarbon radical of from 1 to 3 carbon atoms, wherein the number of substituents on the R group is represented by the value of "a", which is a number from 1 to 3. The alkylene groups in either formula (III) or (IV) may be straight or branched chains containing about 2 to 4 carbon atoms.

Useful as aromatic amines in the process of this invention include compounds of the formula:

(V)

wherein Ar is an aromatic radical of from 6 to 20 carbon atoms, X is halide, —OH, or —OR$^4$, M" is substituted or unsubstituted hydrocarbyl, M''' is H or substituted or unsubstituted hydrocarbyl, Z is an amine moiety containing from 1 to 4 nitrogen atoms, "x" is an integer of from 0 to 3, "b" is an integer of from 0 to 2, "q" is an integer of from 1 to 3, "d" is 0 or 1, with proviso that the sum of x, q and b is from 1 to "v", wherein "v" is the total number of available bonding sites on the unsubstituted Ar radical.

Z can therefore comprise an amine moiety derived from any of the aliphatic or cycloaliphatic amines discussed above. Illustrative of such Z moieties are those of the formula:

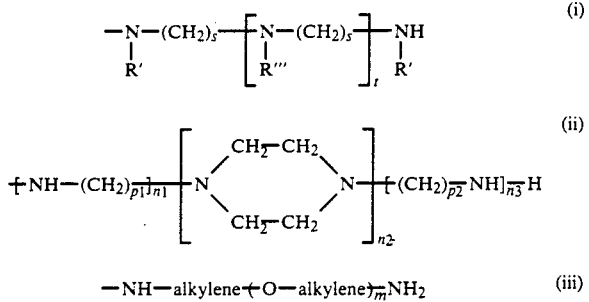

wherein R', R", R''', s and t are as defined above with respect to Formula Ib; p$_1$, p$_2$, n$_1$ and n$_2$ are as defined above with respect to Formula II; and "alkylene" and "m" are as defined above with respect to Formula III;

—N(M')—M'''; (iv)

wherein M' and M''' are independently H or substituted or unsubstituted hydrocarbyl; and

wherein M''' is as defined above,

When M" and M''' are hydrocarbyl, they could each contain up to about 300 carbon atoms, and will therefore include C$_1$ to C$_{300}$ (and preferably C$_1$ to C$_{24}$) alkyl, C$_2$ to C$_{20}$ alkenyl, C$_6$ to C$_{20}$ aryl, C$_7$ to C$_{20}$ alkaryl, C$_7$ to C$_{20}$ aralkyl, C$_3$ to C$_{10}$ heterocyclic and C$_3$ to C$_{10}$ cycloalkyl. Examples of such groups are methyl, ethyl, propyl, butyl, iso-butyl, sec-butyl, ter-butyl, pentyl, hexyl, heptyl, octyl, nonyl, decyl, undecyl, dodecyl, tridecyl, tetradecyl, ethenyl, propenyl, butenyl, pentenyl, hexenyl, heptenyl, octenyl, nonenyl, decenyl, undecenyl, dodecenyl, tridecenyl, tetradecenyl, phenyl, naphthyl, tolyl, xylyl, benzyl, ethylbenzyl, propylbenzyl, cyclopropyl, cyclobutyl, cyclopentyl, cyclohexyl, cycloheptyl, cyclooctyl, cyclononyl, cyclodecyl, and tetrahydrofuryl.

It is to be understood that the term "aromatic radical" as used in the specification and the appended claims is not intended to limit the divalent aromatic moiety represented by Ar to benzene. Accordingly, it is to be understood that the aromatic moiety can be a single aromatic nucleus such as a benzene nucleus, a pyridine nucleus, a thiophene nucleus, a 1,2,3,4-tetrahydronaphthalene nucleus, etc., or any polynuclear aromatic moiety. Such polynuclear moieties can be of the fused type; that is, wherein at least one aromatic nucleus is fused at two points to another nucleus such as found in naphthalene, anthracene, the azanaphthalenes, etc. Alternatively, such polynuclear aromatic moieties can be of the linked type wherein at least two nuclei (either mono or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

When the aromatic moiety, Ar, is a linked polynuclear aromatic moiety it can be represented by the general formula Ar(Lng—Ar)$_w$ wherein w is an integer of 1 to about 4, preferably 0 or 1; Ar in each instance in which it occurs is independently an aromatic moiety as described above, and each "Lng" is a bridging linkage individually chosen from the group consisting of carbon-to-carbon single bonds, ether linkages (e.g. —O—), keto linkages (e.g.,

sulfide linkages (e.g., —S—), polysulfide linkages of 2 to 6 sulfur atoms (e.g., —S$_2$—), sulfinyl linkages (e.g., —S (O) —) sulfonyl linkages (e.g., —S (O)$_2$ —), lower alkylene linkages (e.g.,

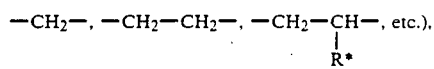

di-(lower alkyl)-methylene linkages (e.g., —CR*$_2$—), lower alkylene ether linkages (e.g.,

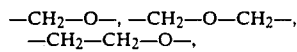

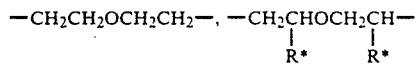

etc.) lower alkylene sulfide linkages (e.g., wherein one or more —O— atoms in the lower alkylene ether linkages is each replaced with an —S— atom), lower alkylene polysulfide linkages (e.g., wherein one or more —O— atoms is each replaced with a —S₂ to —S₆— group), with R* being a lower alkyl group.

Illustrative of such Ar groups are

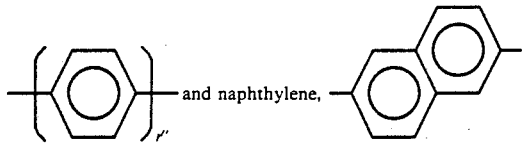
and naphthylene, wherein r″ is an integer of from 1 to 4, such as phenylene

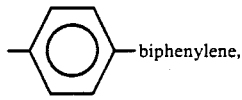
biphenylene,

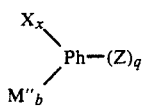
, and the like.

The Ar group will be preferably phenyl or phenyl substituted with 1 to 3, preferably 1 to 2, M″ hydrocarbyl groups (e.g., alkyl groups containing 1 to 300 carbon atoms), and with either 1 to 3 halogen X radicals, (e.g., chloro-, bromo-, or iodo-) or with 1 to 3 hydroxy or $C_1$ to $C_6$ alkoxy or cycloalkoxy X groups. Examples of such substituted aryl radicals are 3-hydroxy-2,4-ditertiarybutyl phenyl, 3-hydroxy-2,4-dipropyl phenyl, 3-hydroxy-2,4-diisopropyl phenyl, 3-hydroxy-2,4-dimethyl phenyl, 3-hydroxy -2,4-dicyclohexyl phenyl, 3-methoxy-2,4-ditertiarybutyl phenyl, 3-methoxy-2,4-dipropyl phenyl, 3-methoxy-2,4-diisopropyl phenyl, 3-methoxy-2,4-dimethyl phenyl, 3-methoxy-2,4-dicyclohexyl phenyl, 3-chloro-2,4-ditertiarybutyl phenyl, 3-chloro-2,4-dipropyl phenyl, 3-chloro-2,4-diisopropyl phenyl, 3-chloro-2,4-dimethyl phenyl, 3-chloro-2,4-dicyclohexyl phenyl, 3-chloro-2,6-dimethyl phenyl, 3-chloro-2,4,6-trimethyl phenyl, 4-chloro-2-isopropyl phenyl, 3-methoxy phenyl, 2-methoxy phenyl, and the like.

When "d" is zero in the above formula V, illustrative of aromatic amines are those of the formula:

$$\begin{matrix} X_x \\ \phantom{X}\diagdown \\ \phantom{XXX}Ph—(Z)_q \\ \phantom{X}\diagup \\ M''_b \end{matrix} \qquad (VI)$$

wherein Ph is phenyl, and wherein X, x, Z, M″, q and b are as follows:

TABLE A

| X | x | M″ | b | Z | q |
|---|---|---|---|---|---|
| — | 0 | —C₂H₅OH | 1 | —NH₂ | 1 |
| — | 0 | —C₂H₅Ph | 1 | —NH₂ | 1 |
| — | 0 | —CH₃ | 1 | —NH₂ | 1 |
| — | 0 | —CH₃ | 1 | —NH₂ | 2 |
| — | 0 | —CH₃ | 1 | —NH₂ | 3 |
| — | 0 | —OCH₃ | 1 | —NH₂ | 1 |
| — | 0 | —OCH₃ | 1 | —NH₂ | 2 |
| — | 0 | —OCH₃ | 1 | —NH₂ | 3 |
| — | 0 | —C₂H₅ | 1 | —NH₂ | 1 |
| — | 0 | —OC₂H₅ | 1 | —NH₂ | 1 |
| —OH | 1 | — | 0 | —NH₂ | 1 |
| —Cl | 1 | — | 0 | —NH₂ | 1 |
| —OH | 1 | —CH₃ | 1 | —NH₂ | 1 |

TABLE A-continued

| X | x | M″ | b | Z | q |
|---|---|---|---|---|---|
| —Cl | 1 | —CH₃ | 1 | —NH₂ | 1 |
| —OH | 1 | —C₂H₅ | 1 | —NH₂ | 1 |
| —Cl | 1 | —CH₃ | 1 | —NH₂ | 1 |
| —OH | 1 | —C₃H₇ | 1 | —NH₂ | 1 |
| —OH | 1 | —C₃H₇ | 2 | —NH₂ | 2 |
| —OH | 1 | — | 0 | —NH₂ | 2 |
| —Cl | 1 | — | 0 | —NH₂ | 2 |
| —OH | 1 | —CH₃ | 1 | —NH₂ | 2 |
| —Cl | 1 | —CH₃ | 1 | —NH₂ | 2 |
| —OH | 1 | —C₂H₅ | 1 | —NH₂ | 2 |
| — | 0 | — | 0 | —NH₂ | 1 |
| — | 0 | — | 0 | —NH₂ | 2 |
| — | 0 | — | 0 | —NH₂ | 3 |
| —OH | 1 | — | 0 | —NHCH₃ | 1 |
| —Cl | 1 | — | 0 | —NHCH₃ | 1 |
| —OH | 1 | —CH₃ | 1 | —NHCH₃ | 1 |
| —Cl | 1 | —CH₃ | 1 | —NHCH₃ | 1 |
| —OH | 1 | —C₂H₅ | 1 | —NHCH₃ | 1 |
| —Cl | 1 | —CH₃ | 1 | —NHCH₃ | 1 |
| —OH | 1 | —C₃H₇ | 1 | —NHCH₃ | 1 |
| —OH | 1 | —C₃H₇ | 2 | —NHC₂H₅ | 2 |
| —OH | 1 | — | 0 | —NHC₂H₅ | 2 |
| —Cl | 1 | — | 0 | —NHC₂H₅ | 2 |
| —OH | 1 | —CH₃ | 1 | —NHC₂H₅ | 2 |
| —Cl | 1 | —CH₃ | 1 | —NHC₂H₅ | 2 |
| —OH | 1 | —C₂H₅ | 1 | —NHC₂H₅ | 2 |
| — | 0 | — | 0 | —NHC(=NH)NH₂ | 1 |
| — | 0 | — | 0 | —NHC(=NH)NH(CH₃) | 1 |
| — | 0 | —Ph | 0 | —NHC₂H₅ | 2 |
| — | 0 | —Ph(CH₃) | 0 | —NHC₂H₅ | 3 |
| — | 0 | —Ph(CH₃)₂ | 0 | —NHPh | 1 |
| — | 0 | —PhNH₂ | 0 | —NHPh | 2 |
| — | 0 | —C₂H₅OH | 1 | —NHPh | 1 |
| — | 0 | —C₂H₅Ph | 1 | —NHPh | 1 |
| — | 0 | —CH₃ | 1 | —NHPh | 1 |
| — | 0 | —CH₃ | 1 | —NHPh | 2 |
| — | 0 | —CH₃ | 1 | —NHPh | 3 |
| — | 0 | —OCH₃ | 1 | —NHPh | 1 |
| — | 0 | —OCH₃ | 1 | —NHPh | 2 |
| — | 0 | —OCH₃ | 1 | —NHPh | 3 |
| — | 0 | —C₂H₅ | 1 | —NHPh | 1 |
| — | 0 | —OC₂H₅ | 1 | —NHPh | 1 |
| —OH | 1 | — | 0 | —NHPh | 1 |
| —Cl | 1 | — | 0 | —NHPh | 1 |
| —OH | 1 | —CH₃ | 1 | —NHPh | 1 |
| —Cl | 1 | —CH₃ | 1 | —NHPh | 1 |
| —OH | 1 | —C₂H₅ | 1 | —NHPh | 1 |
| —Cl | 1 | —CH₃ | 1 | —NHPh | 1 |
| —OH | 1 | —C₃H₇ | 1 | —NHPh | 1 |
| — | 0 | —CH₃ | 1 | —NHPh(CH₃) | 1 |
| — | 0 | —CH₃ | 1 | —NHPh(CH₃) | 2 |
| — | 0 | —CH₃ | 1 | —NHPh(CH₃) | 3 |
| — | 0 | —OCH₃ | 1 | —NHPh(OCH₃) | 1 |
| — | 0 | —OCH₃ | 1 | —NHPh(OCH₃) | 2 |
| — | 0 | —OCH₃ | 1 | —NHPh(OCH₃) | 3 |
| — | 0 | —C₂H₅ | 1 | —NHPh(C₂H₅) | 1 |
| — | 0 | —OC₂H₅ | 1 | —NHPh(OC₂H₅) | 1 |
| —OH | 1 | — | 0 | —NHPhOH | 1 |
| —Cl | 1 | — | 0 | —NHPhCl | 1 |
| —OH | 1 | —CH₃ | 1 | —NHPh(OH)(CH₃) | 1 |
| —Cl | 1 | —CH₃ | 1 | —NHPh(Cl)(CH₃) | 1 |
| —OH | 1 | —C₂H₅ | 1 | —NHPh(OH) | 1 |
| —Cl | 1 | —CH₃ | 1 | —NHPh(Cl)(CH₃) | 1 |
| —OH | 1 | —C₃H₇ | 1 | —NHPh(OH)(CH₃) | 1 |
| — | 0 | —CH₃ | 1 | —NHnaphthyl | 1 |
| —OH | 1 | — | 0 | —NHnaphthyl | 1 |
| —Cl | 1 | — | 0 | —NHnaphthyl | 1 | wherein Ph is phenylene.

Illustrative aromatic amines of Formula V wherein "d" is zero and Ar is phenylene are phenylamine and aminophenols such as 2-aminophenol, 3-aminophenol, 4-aminophenol, 4-amino-3-methylphenol, 4-amino-3-chlorophenol, 4-amino-2-bromophenol and 4-amino-3-ethylphenol; amino-substituted polyhydroxyaryls such as the aminocatechols, the amino resorcinols, and the aminohydroquinones, e.g., 4-amino-1,2- dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Illustrative of aromatic amines of Formula V wherein "d" is zero and Ar is naphthylene are aminonaphthols include 1-amino-5-hydroxynaphthalene, 1-amino-3-hydroxynaphthalene and the like.

When "d" in Formula V is "1", the aromatic amine can comprise a Mannich Base condensation product of at least one hydroxy-aromatic compound, aldehyde reactant and amine. The hydroxy-aromatic compounds can comprise one or more compounds of the formula (VII):

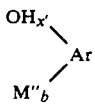

wherein $x'$ is an integer of from 1 to 3, and Ar, M''', and b are as defined above, with the proviso that the sum of $x'$ and b is from 1 to "v", wherein "v" is the total number of available bonding sites on the unsubstituted Ar radical.

The aldehyde reactants will generally comprise at least one compound of the formula: HC(O)M''', wherein M''' is as defined above. Preferred are formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: M'''CHO, wherein M''' is H or a hydrocarbon radical having from 1 to 4 carbon atoms.

The Mannich base condensation product formed by the reaction of the hydroxy aromatic compound with an amine reactant and formaldehyde can comprise higher condensation products which can be illustrated by adducts of the structure (VIII):

H—(A—A')$_{x_1}$—Ar'A'—A—(A'Ar'A'A)$_{x_2}$—(A'Ar')$_{x_3}$—H wherein $x_1$ is 0 or 1, $x_2$ is an integer of 0 to 8, $x_3$ is 0 or 1, A is a bivalent bis-N terminated amino group derived from the amine reactant and comprises an amine group containing from 1 to 4 (preferably from 3 or 4) nitrogen atoms, and A' comprises the group —CH(T'')— wherein T'' is H or alkyl of from 1 to 9 carbon atoms and is derived from the corresponding aldehyde reactant, and Ar' comprises the moiety (IX):

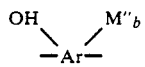

wherein M'', b and Ar are as defined above for the hydroxy aromatic compounds of Formula VII. Generally adducts of Formula VIII above are those wherein $x_1$ is 0, $x_2$ is 1 to 3, and $x_3$ is and most preferably wherein M'' is alkyl of 1 to 3 carbon atoms, Ar is phenylene.

Preferably, the "A" bivalent amino group in the adducts of Formula VIII will comprise terminal —NH— groups, as exemplified by the structures of the formula:

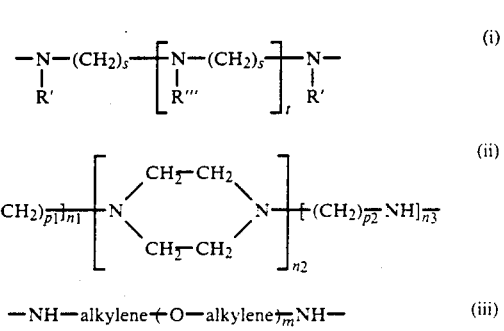

wherein R', R'', R''', s and t are as defined above with respect to Formula Ib; $p_1$, $p_2$, $n_1$ and $n_2$ are as defined above with respect to Formula II; and "alkylene" and "m" are as defined above with respect to Formula III.

Illustrative adducts of structure VIII are set forth in Table B below:

TABLE B

| $x_1$ | $x_2$ | $x_3$ | Ar' | A' | A |
|---|---|---|---|---|---|
| 0 | 2 | 1 | —Ph(OH)— | —CH$_2$— | —NHC$_2$H$_4$NHC$_2$H$_4$NH— |
| 0 | 2 | 1 | —Ph(OH)— | —CH$_2$— | —NHC$_2$H$_4$(NHC$_2$H$_4$)$_2$NH— |
| 0 | 2 | 1 | —Ph(OH)— | —CH$_2$— | —NHC$_2$H$_4$NH— |
| 0 | 2 | 1 | —Ph(OH)— | —CH$_2$— | —NHC$_3$H$_6$NH— |
| 0 | 1 | 0 | —Ph(OH)— | —CH$_2$— | —NHC$_2$H$_4$(NHC$_2$H$_4$)$_2$NH— |
| 0 | 0 | 0 | —Ph(OH)— | —CH$_2$— | —NHC$_2$H$_4$(NHC$_2$H$_4$)$_2$NH— |
| 0 | 1 | 1 | —Ph(OH)— | —CH$_2$— | —NHC$_2$H$_4$(NHC$_2$H$_4$)$_2$NH— |
| 1 | 2 | 0 | —Ph(OH)— | —CH(CH$_3$)— | —NHC$_2$H$_4$(NHC$_2$H$_4$)$_2$NH$^2$— |
| 1 | 0 | 1 | —Ph(OH)— | —CH(CH$_3$)— | —NHC$_3$H$_6$(NHC$_3$H$_6$)$_2$NH— |
| 1 | 3 | 0 | —Ph(OH)— | —CH(CH$_3$)— | —NHC$_3$H$_6$NHC$_3$H$_6$NH— |
| 1 | 1 | 0 | —Ph(OH)— | —CH(CH$_3$)— | —NHC$_2$H$_4$NHC$_2$H$_4$NH— |
| 1 | 1 | 1 | —Ph(OH)— | —CH(CH$_3$)— | —NHC$_3$H$_6$(NHC$_3$H$_6$)$_2$NH— |

(Ph = phenyl)

A preferred group of Mannich Base aromatic amine condensation products are those formed by condensing (A) hydroxy-aromatic compounds (e.g. phenol or $C_1$ to $C_4$ alkyl substituted phenol) with (B) formaldehyde and (C) polyethylene amines, e.g., ethylene diamine, diethylene triamine, triethylene tetraamine, propylene diamine, dipropylene triamine, tripropylene tetraamine, polyoxyethylene and polyoxypropylene diamines, e.g., polyoxypropylene diamine, and combinations thereof using a A:B:C molar ratio of 1-8:1:0.1-10, and preferably 2-6 1:1-4.

The Mannich Base condensation reaction to form the aromatic amines of Formula V above wherein "d" is one can be accomplished by means known in the art, such as the methods described in U.S. Pat. Nos. 3,442,808, 3,649,229 and 3,798,165 (the disclosures of which are hereby incorporated by reference in their entirety). Generally, the amine, hydroxy aromatic compound and aldehyde will be contacted at a temperature of from about 20° to 150° C. for a period of from about 1 to 10 hours, under $N_2$ or other inert gas, followed by stripping to remove unreacted amounts of the aldehyde and/or amine. Any convenient pressure can be employed, such as atmospheric, superatmospheric or subatmospheric.

Most preferably, when the aldehyde comprises formaldehyde (or a material which generates formaldehyde in situ), and the amine comprises a di-primary amine (e.g., triethylene tetraamine), the formaldehyde and diprimary amine are employed in an amount of about $2(n-1)$ moles of formaldehyde and about $(n-1)$ moles of diprimary amine per "n" molar equivalents charged of the hydroxy-aryl group.

The amine treatment compound and metal salt product are contacted in the presence of a liquid medium which can comprise an inert diluent or solvent for the reactants. Generally useful are hydrocarbon solvents, such as mineral oils, synthetic lubricating oils, and the like. For example, the solvent employed in the preparation of the metal salt product can be passed to the amine contacting step.

The amine treatment compound can be readily reacted or complexed with the dicarboxylic acid metal salt material, e.g., the copper or zinc metal salt product of polyalkenyl substituted succinic anhydride, by contacting the selected amine compound with the metal salt product for a time and under conditions sufficient to react (or complex) the amine treatment compound with at least a portion of the polyolefinic substituted dicarboxylic acid metal salt product. Generally, the amine treatment compound and the metal salt product will be contacted with stirring at a temperature of from about 100° to 150° C., preferably 110° to 135° C., generally for 0.3 to 10, e.g., 30 min. to 3 hours. The contacting is preferably conducted in an inert atmosphere (e.g., under $N_2$). Treatment ratios of the dicarboxylic acid metal salt product to equivalents of amine treatment compound can vary considerably, depending upon the reactants and type of bonds formed. The selected amine treatment compound should be introduced in amount sufficient to provide an excess of reactive primary or secondary amine above that amount of reactive primary or secondary amine required for reaction with the equivalents of free polyolefinic substituted dicarboxylic acid or anhydride and for complexation with the metal in the metal salt product. Generally, the selected amine compound is introduced in amount sufficient to provide from about 1 to 10, preferably about 1.5 to 5, equivalents of reactive primary or secondary amine per mole of dicarboxylic acid moiety content of the polyolefinic substituted dicarboxylic acid or anhydride metal salt product so treated. After the desired contacting time, the contacting mixture is preferably stripped (e.g., with $N_2$ or other substantially insert gas) at elevated temperature (e.g., from about 120 to 150° C.) to remove water of reaction and remaining amine treatment compound which has not reacted or complexed with the metal salt product.

After stripping unreacted amine treatment compound and water from the reaction mixture, the product is filtered to remove process sediment and unconverted metal reactants (if the latter have not been sufficiently removed in filtering of the metal salt product charged to the amine reaction step of the process). The resulting solution will be generally characterized by a kinematic viscosity of from about 200 to 1400 cSt (at 100° C.). The products prepared by the process of this invention will generally comprise from about 20 to 60 wt%, more typically from about 20 to 45 wt%, of the metal salt of the polyolefinic substituted dicarboxylic acid material (both amine complexed and uncomplexed), from about 1 to 20 wt%, more typically from about 2 to 10 wt%, of the non-metal-containing reaction product formed by reaction of the amine treatment compound and the polyolefinic substituted dicarboxylic acid material, and from about 25 to 80 wt%, more typically from about 40 to 60 wt%, of a lubricating oil (e.g., a lubricating oil of the type conventionally used in crankcase lubricating oils as described below). Preferably, the product prepared by the process of this invention contains less than about 0.1 wt.%, and more preferably less than about 0.05 wt.%, of unreacted amine treatment compound.

The lubricating oil additives prepared by the process of this invention, as described above, have advantageously improved viscosity properties and are useful as lubricating oil additives, e.g. as antioxidants, in internal combustion crankcase lubricating oils (e.g., automotive engines, which are fueled by gasoline, methanol, diesel and other conventional fuels). Accordingly, the additive can be used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed.

The additive mixtures of the present invention find their primary utility in lubricating oil compositions which employ a base oil in which the additive is dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers (e.g., ethylene-propylene copolymer VI improvers, dispersant-viscosity improver polymers, and the like), supplemental antioxidants, corrosion inhibitors, detergents (e.g., neutral or basic (including overbased) alkali and alkaline earth metal salts of alkyl phenates, sulfurized alkyl phenates, alkylsulfonic acids, etc.), dispersants (e.g., high molecular weight ashless nitrogen- and ester-containing dispersants and the borated derivatives thereof), pour point depressants, antiwear agents (e.g., zinc dialkyldithiophosphates), friction modifiers (e.g., glycerol oleates), .etc. Suitable such other additives for use in combination with the additives of the present invention are disclosed in U.S. Pat. Nos. 4,113,639; 4,173,540; 4,388,201; 4,502,970; and 4,797,219, the disclosure of each of which is hereby incorporated by reference in its entirety.

This invention will be further understood by reference to the following examples, wherein all parts are parts by weight, unless otherwise noted. The examples are intended only to exemplify the invention and not limit it in any way. In the Examples, the term "Sap. No." refers to the saponification number of the indicated materials, in units of mg KOH/g., as determined by ASTM Method D94.

This invention will be further understood by reference to the following examples, wherein all parts are parts by weight, unless otherwise noted. The examples are intended only to exemplify the invention and not limit it in any way. In the Examples, the term "Sap. No." refers to the saponification number of the indicated materials, in units of mg KOH/g., as determined by ASTM Method D94.

EXAMPLES

Example 1

(a) About 3830 g. (3.8 mole) of a polyisobutenyl succinic anhydride (Sap. No. 111) derived from a 950 $\overline{M}_n$ polyisobutylene is charged to a stirred reaction flask equipped with a reflux condenser, and 850 g. of cupric acetate monohydrate (31.3 wt% Cu), 3020 g. of diluent oil solvent (150N) and 175 g. of water are added. The reaction mass is heated to 110° C., after which it is soaked for one hour and then stripped for one hour with dry $N_2$ gas. Subsequently, 85 g. of water are added to the mixture, and the soaking and stripping steps are repeated. Four more water additions (of between 70 and 100 g. of water each), with the accompanying soaking and stripping steps, are carried out. The reaction mixture is then stripped with dry $N_2$ for 3 hours and filtered to remove any unreacted solids or solid by-products. The filtrate analyzes for 2.85 wt.% copper.

(b) To 100 g. of the product of step (a) is added 1.6 grams of diethylenetriamine (containing 38 wt.% nitrogen and having 3 nitrogen atoms per molecule) at a temperature of about 120° C. After the amine addition, the mixture is allowed to react for 30 minutes. Thereafter, unreacted amine and the water of reaction is removed from the reaction medium using a 2-hr. dry $N_2$ strip at 120° C. The resulting liquid is then filtered to remove process sediment. The resulting filtrate analyzes for 2.84 wt.% copper.

Example 2

(a) About 100 g. of a polyisobutenyl succinic anhydride (Sap. No. 106.9) derived from a 950 number average molecular weight polyisobutylene polymer, is charged to a reaction flask, and 67.6 g. of diluent oil solvent 150N, 5 g. of water, and 20.9 g. of cupric acetate monohydrate are added. The reactants are heated to 110° C., and soaked and stripped as described in Example 1. Subsequently, three 1-g. additions of water, followed by soaking and stripping steps are carried out. The reaction mixture is then stripped with dry $N_2$ for 4 hours at 135° C. This intermediate product analyzes for 3.34 wt% copper.

(b) The reaction mass is then cooled to 120° C., and 2.8 g. of diethylenetriamine are added. The reaction mixture is allowed to react for 30 minutes. Unreacted amine and the water of reaction are removed using a 2-hour strip with dry $N_2$ gas. The resulting product is then filtered, and the filtrate is found to contain 3.3 wt% copper and 0.67 wt% nitrogen.

Example 3

The procedure of Example 2 is repeated, except that the initial water charge is increased to 8.75 g. and after charging the raw materials the reaction mixture is heated to 110° C. and held at that temperature for 6 hours. Then the reaction mixture is stripped with dry $N_2$ gas for 2 hours at 135° C. The amine treatment is carried out as in Example 2(b) above. The product is found to contain 3.3 wt copper.

The products of the first and second stages in each of Examples 1 through 3 are tested to determine their initial viscosities. Samples of each material are stored for from 1 to 4 weeks at either 25° C. or 54° C. to determine the rate of viscosity growth over this term. The data thereby obtained are summarized in Table I below.

TABLE I

| Example No. | Viscosities (cSt at 100° C.) | | | | |
|---|---|---|---|---|---|
| | Initial | 25° C. | | 54° C. | |
| | | 1 week | 4 weeks | 1 week | 4 weeks |
| 1(a) | 593 | 589 | 643 | 658 | 1017 |
| 1(b) | 408 | 429 | 420 | 465 | 509 |
| 2(a) | 779 | 813 | 880 | 848 | 1192 |
| 2(b) | 598 | 609 | 614 | 608 | 615 |
| 3(a) | 716 | 717 | — | 878 | — |
| 3(b) | 537 | 546 | — | 575 | — |

As the above data show, the products of this invention in Examples 1(b), 2(b), and 3(b) are characterized by initial viscosities which were considerably reduced over those of Examples 1(a), 2(a), and 3(a), even though additional amine reacted with the products of the step (a) mixtures would have been expected to enhance the viscosity of these materials by virtue of the addition thereto of the amine reactant. Further, the products of this invention in Examples 1(b), 2(b) and 3(b) showed much greater viscosity stability during storage, both at room temperature and at elevated temperature (54° C.).

Comparative Example 4

100 g. of the product as prepared in Example 1 (a) are charged to a stirred reaction flask, together with 2.5 g. of a polyethylene polyamine bottoms product (avg. approximately 6.5 nitrogen atoms and 11 carbon atoms per molecule). The mixture is heated to 120° C. An orange-brown precipitate forms, and continues to form until the original color of the metal succinate is no longer evident, thereby indicating that copper was removed from the additive solution due to side reactions with the charged alkylene polyamine.

Example 5

(a) About 140 g. of a polyisobutenyl succinic anhydride (Sap. No. 69) derived from a 1300 number average molecular weight polyisobutylene polymer, is charged to a stirred reaction flask, and 56.9 g. of additional diluent oil solvent 150N, 8.75 g. of water, and 18.1 g. of cupric acetate monohydrate are added. The reactants are heated to 110° C. for 6 hours. Then, the reaction mixture is stripped with dry $N_2$ gas for 2 hours at 135° C.

(b) The reaction mass is then cooled to 120° C. and 3.0 g. of hexylamine are added. The reaction mixture is allowed to react for 60 minutes. Unreacted amine and the water of reaction are removed using a 2-hour strip with dry N₂ gas. The resulting product is then filtered, and the filtrate is found to contain 2.7 wt% copper and 0.2 wt% nitrogen.

Example 6

(a) About 200 g. of a polyisobutenyl succinic anhydride (Sap. No. 43) derived from a 2200 number average molecular weight polyisobutylene polymer, is charged to a stirred reaction flask, and 66.1 g. of additional diluent oil solvent 150N, 10 g. of water, and 17 g. of cupric acetate monohydrate are added. The reactants are heated to 110° C. for 6 hours. Then, the reaction mixture is stripped with dry N₂ gas for 2 hours at 135° C. The resulting product is then filtered, and the filtrate is found to have a kinematic viscosity of 1500 cSt (at 100° C.) and to contain 1.59 wt% copper.

(b) The reaction mass is then cooled to 120° C., and 1.4 g. of dimethylaminopropyl amine are added. The reaction mixture is allowed to react for 30 minutes. Unreacted amine and the water of reaction are removed using a 2-hour strip with dry N₂ gas. The resulting product is then filtered, and the filtrate is found to contain 1.5 wt% copper and 0.27 wt% nitrogen and is found to have a kinematic viscosity of 1310 cSt (at 100° C.).

Example 7

About 80 g. of the product of Example 1 (a) are charged to a stirred reaction flask, along with 1.66 g. of dimethylaminopropyl amine. The reaction mixture is heated to 120° C. and held at that temperature for 30 minutes. Then the reaction mixture is stripped with dry N₂ gas for 2 hours. The resulting product is then filtered, and the filtrate is found to have a kinematic viscosity of 580 cSt (at 100° C.) and to contain 2.62 wt% copper.

Example 8

The procedure of Example 1 (b) is repeated except that 1.1 grams of triethylene tetraamine, having 2 primary amine and 2 secondary amine groups per molecule, is used as the amine treatment compound.

Example 9

The procedure of Example 1 (b) is repeated except that 1.41 grams of phenylamine, having 1 primary amine group per molecule, is used as the amine treatment compound, and the reaction time is 3 hours.

Example 10

The procedure of Example 1 (b) is repeated except that 2.56 grams of diphenylamine, having 1 secondary amine group per molecule, is used as the amine treatment compound, and the reaction time is 6 hours.

Example 11

The procedure of Example 1 (b) is repeated except that 2.05 grams of phenylguanidine, having 3 nitrogen atoms per molecule, is used as the amine treatment compound, and the reaction time is 3 hours.

Example 12

The procedure of Example 1 (b) is repeated except that 2.56 grams of naphthylamine, having 1 primary amine group per molecule, is used as the amine treatment compound, and the reaction time is 3 hours.

Having thus described the invention by direct disclosure and by example, it should be apparent to anyone having ordinary skill in this art that there exist equivalent reactants and variations of the process which are within the spirit of the invention as expressed in the claims which follow.

What is claimed is:

1. A method of producing an oleaginous composition containing copper salts of polyolefinic substituted dicarboxylic acids having reduced viscosity comprising the steps of:

(a) providing a copper salt of a polyolefinic substituted dicarboxylic acid material containing in excess of about 1 wt% free polyolefinic substituted dicarboxylic acid material, said polyolefinic substituent being derived from an olefin polymer of a $C_2$ to $C_{10}$ monoolefin having a number average molecular weight greater than about 600, and said dicarboxylic acid moiety being derived from a $C_4$ to $C_{10}$ monounsaturated acid material; and (b) contacting the product of step (a) in lubricating oil with an effective amount of an amine selected from the group consisting of aliphatic, cycloaliphatic and aromatic amines containing from 1 to 4 nitrogen atoms per molecule, said amine having at least one primary or secondary nitrogen atom per molecule, under conditions sufficient to effect reaction with the equivalents of free polyolefinic substituted dicarboxylic acid material and reaction or complexation of said amine with at least a portion of the polyolefinic substituted dicarboxylic acid copper salt product of step (a), whereby said oleaginous composition is obtained having a reduced viscosity.

2. The process of claim 1 wherein the monounsaturated acid material comprises at least one member selected from the group consisting of maleic acid, maleic anhydride, itaconic acid, chloromaleic acid, dimethyl fumarate and chloromaleic anhydride.

3. The process of claim 2 wherein the polyolefinic substituent comprises polyisobutylene, polybutylene or mixtures thereof.

4. The process of claim 3 wherein the polyolefinic substituent is derived from a polymer having a number average molecular weight of from about 900 to 3000.

5. The process of claim 4 wherein the monounsaturated acid material comprises maleic anhydride.

6. The process of claim 1 wherein the amine comprises at least one aliphatic saturated amine of the general formulas:

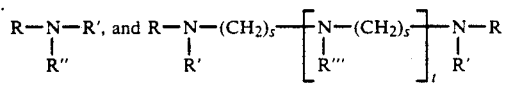

wherein R, R', R" and R''' are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R''' can additionally comprise a moiety of the formula:

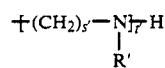

wherein R' is as defined above, and wherein each s and s' can be the same or a different number of from 2 to 6, and t and t' can be the same or different and are each numbers of from 0 to 2, with the proviso that the amine contains not greater than 4 nitrogen atoms per molecule.

7. The process of claim 1 wherein the amine contains from one to two primary amine groups.

8. The process of claim 1 wherein the amine comprises at least one member selected from the group consisting of 1,2-diaminoethane; 1,3-diaminopropane; 1,4-diaminobutane; 1,6-diaminohexane; diethylene triamine; triethylene tetramine; 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 2-propyldodecylamine; N-dodecyl-1,3-propane diamine; diisopropanol amine; diethanol amine; and N-(3-aminopropyl) morpholine.

9. The process of claim 1 wherein the amine comprises at least one of alicyclic diamines, heterocyclic nitrogen compounds, and N-aminoalkyl piperazines of the general formula:

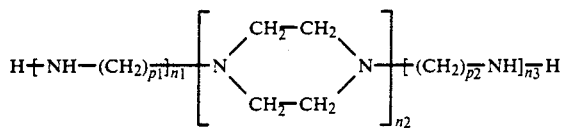

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1$, $n_2$ and $n_3$ is not greater than 3.

10. The process of claim 1 wherein the amine comprises diethylene triamine, triethylenetetramine and piperazines.

11. The process of claims 1 wherein the amine comprises at least one polyoxyalkylene polyamine of the formulae:

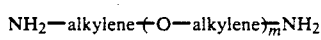

where m has a value of about 1 to 2; and

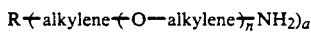

wherein "n" has a value of about 1 to 2, and R is a substituted saturated hydrocarbon radical of from 1 to 3 carbon atoms, wherein the number of substituents on the R group is represented by the value of "a", which is a number from 1 to 3.

12. The process of claim 11 wherein said alkylene groups are straight or branched chain and contain from about 2 to 4 carbon atoms.

13. The process of claim 1 wherein said amine and said copper product of step (a) are contacted with stirring at a temperature of from about 100° to 150° C. for a period of from about 30 min. to 3 hours.

14. The process of claim 1 wherein said amine is introduced in amount sufficient to provide from about 1 to 10 equivalents of reactive primary or secondary amine per mole of dicarboxylic acid moiety content of said product of step (a).

15. The process of claim 1 wherein said amine is introduced in amount sufficient to provide from about 1.5 to 5 equivalents of reactive primary or secondary amine per mole of dicarboxylic acid moiety content of said product of step (a).

16. The process of claim 15 wherein said amine and said product of step (a) product are contacted at a temperature of from about 110° to 135° C. for a period of from about 30 min. to 3 hours.

17. The process of claim 1 wherein the amine comprises at least one aromatic amine of the general formula:

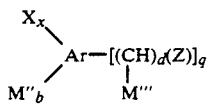

wherein Ar is an aromatic radical of from 6 to 20 carbon atoms, X is halide, —OH, or —OR$^4$, M" is substituted or unsubstituted hydrocarbyl, M'" is H or substituted or unsubstituted hydrocarbyl, R$^4$ is substituted or unsubstituted hydrocarbyl, Z is an amine moiety containing from 1 to 4 nitrogen atoms, "x" is an integer of from 0 to 3, "b" is an integer of from 0 to 2, "q" is an integer of from 1 to 3, "d" is 0 or 1, with proviso that the sum of x, q and b is from 1 to "v", wherein "v" is the total number of available bonding sites on the unsubstituted Ar radical.

18. The process of claim 17 wherein the Z comprises an amine moiety selected from the group consisting of moieties of the formula:

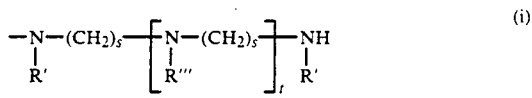

wherein R, R', R" and R'" are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R'" can additionally comprise a moiety of the formula:

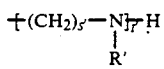

wherein R' is as defined above, and wherein each s and s' can be the same or a different number of from 2 to 6, and t and t' can be the same or different and are each numbers of from 0 to 2,

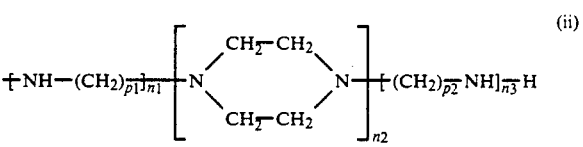

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1$, $n_2$ and $n_3$ is not greater than 3,

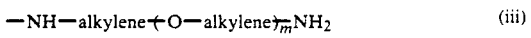

wherein "m" has a value of about 1 to 2 and wherein said alkylene groups are straight or branched chain and contain from about 2 to 4 carbon atoms;

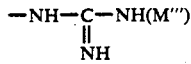

wherein M' and M''' are independently H or substituted or unsubstituted hydrocarbyl; and —NH—C—NH(M''')  (v)
‖
NH wherein M''' is as defined above.

19. The process of claim 17 wherein the aromatic amine comprises at least one member selected from the group consisting of aminophenols, amino-substituted polyhydroxyaryls, aminocatechols, amino resorcinols, aminohydroquinones and aminonaphthols.

20. The process of claim 19 wherein the aromatic amine comprises at least one member selected from the group consisting of diphenylamine, 2-aminophenol, 3-aminophenol, 4-aminophenol, 4-amino-3-methylphenol, 4-amino-3-chlorophenol, 4-amino-2-bromophenol and 4-amino-3-ethylphenol, 4-amino-1,2- dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene, 1-amino-5-hydroxynaphthalene and 1-amino-3-hydroxynaphthalene.

21. An aleaginous composition having improved viscosity stability which comprises a lubricating oil and a copper salt lubricating oil additive produced by a process which comprises:
(a) providing a copper salt of a polyolefinic substituted dicarboxylic acid material containing in excess of about 1 wt% free polyolefinic substituted dicarboxylic acid material said polyolefinic substituent being derived from an olefin polymer of a $C_2$ to $C_{10}$ monoolefin having a number average molecular weight greater than about 600, and said dicarboxylic acid moiety being derived from a $C_4$ to $C_{10}$ monosaturated acid material; and
(b) contacting the product of step (a) with an effective amount of an amine selected from the group consisting of aliphatic, cycloaliphatic and aromatic amines containing from 1 to 4 nitrogen atoms per molecule, said amine having at least one primary or secondary nitrogen atom per molecule, under conditions sufficient to effect reaction with the equivalents of free polyolefinic substituted dicarboxylic acid material and reaction or complexation of said amine with at least a portion of the polyolefinic substituted dicarboxylic acid copper salt product of step (a), whereby said oleaginous composition is obtained having a reduced viscosity.

22. The oleaginous composition of claim 21 wherein the monounsaturated acid material comprises at least one member selected from the group consisting of maleic acid, maleic anhydride, itaconic acid, chloromaleic acid, dimethyl fumarate and chloromaleic anhydride.

23. The oleaginous composition of claim 22 wherein the polyolefinic substituent comprises polyisobutylene, polybutylene or mixtures thereof.

24. The oleaginous composition of claim 23 wherein the polyolefinic substituent is derived from a polymer having a number average molecular weight of from about 900 to 3000.

25. The oleaginous composition of claim 24 wherein the monounsaturated acid material comprises maleic anhydride.

26. The oleaginous composition of claim 21 wherein the amine comprises at least one aliphatic saturated amine of the general formulas:

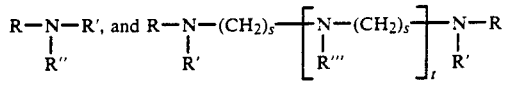

wherein R, R', R" and R''' are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R''' can additionally comprise a moiety of the formula:

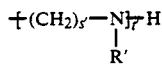

wherein R' is as defined above, and wherein each s and s' can be the same or a different number of from 2 to 6, and t and t' can be the same or different and are each numbers of from 0 to 2, with the proviso that the amine contains not greater than 4 nitrogen atoms per molecule.

27. The oleaginous composition of claim 21 wherein the amine contains from one to two primary amine groups.

28. The oleaginous composition of claim 21 wherein the amine comprises at least one member selected from the group consisting of 1,2-diaminoethane; 1,3-diaminopropane; 1,4-diaminobutane; 1,6-diaminohexane; diethylene triamine; triethylene tetramine; 1,2-propylene diamine; di-(1,2-propylene)triamine; di-(1,3-propylene) triamine; N,N-dimethyl1,3-diaminopropane; N,N-di-(2-aminoethyl) ethylene diamine; N,N-di(2-hydroxyethyl)-1,3-propylene diamine; 2-propyldodecylamine; N-dodecyl-1,3-propane diamine; diisopropanol amine; diethanol amine; and N-(3-aminopropyl) morpholine.

29. The oleaginous composition of claim 21 wherein the amine comprises at least one of alicyclic diamines, heterocyclic nitrogen compounds, and N-aminoalkyl piperazines of the general formula:

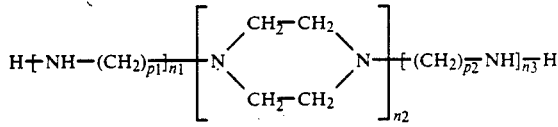

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1$, $n_2$ and $n_3$ is not greater than 3.

30. The oleaginous composition of claim 21 wherein the amine comprises diethylene triamine, triethylenetetramine and piperazines.

31. The oleaginous composition of claim 21 wherein the amine comprises at least one polyoxyalkylene polyamine of the formulae:

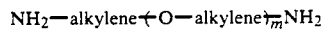

where m has a value of about 1 to 2; and

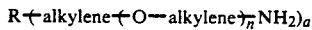

where "n" has a value of about 1 to 2, and R is a substituted saturated hydrocarbon radical of from 1 to 3 carbon atoms, wherein the number of substituents on the R group is represented by the value of "a", which is a number from 1 to 3.

32. The oleaginous composition of claim 31 wherein said alkylene groups are straight or branched chain and contain from about 2 to 4 carbon atoms.

33. The oleaginous composition of claim 21 wherein said amine and said product of step (a) are contacted with stirring at a temperature of from about 100° to 150° C. for a period of from about 0.3 to 10 hours.

34. The oleaginous composition of claim 21 wherein said amine is introduced in amount sufficient to provide from about 1 to 10 equivalents of reactive primary or secondary amine per mole of dicarboxylic acid moiety content of said product of step (a).

35. The oleaginous composition of claim 21 wherein said amine is introduced in amount sufficient to provide from about 1.5 to 5 equivalents of reactive primary or secondary amine per mole of dicarboxylic acid moiety content of said product of step (a).

36. The oleaginous composition of claim 35 wherein said amine and said product of step (a) are contacted at a temperature of from about 110° to 135° C. for a period of from about 30 min. to 3 hours.

* * * * *